United States Patent [19]

Behrend

[11] Patent Number: 5,055,975

[45] Date of Patent: Oct. 8, 1991

[54] ELECTROLYTE CAPACITOR

[75] Inventor: Guenter Behrend, Anhausen, Fed. Rep. of Germany

[73] Assignee: Siemens Aktiengesellschaft, Munich, Fed. Rep. of Germany

[21] Appl. No.: 539,349

[22] Filed: Jun. 15, 1990

[30] Foreign Application Priority Data

Jun. 29, 1989 [EP] European Pat. Off. ........ 89111872.1

[51] Int. Cl.$^5$ ................................................ H01G 9/02
[52] U.S. Cl. ..................................... 361/527; 252/62.2
[58] Field of Search ............... 361/507, 511, 524, 526, 361/523, 527; 252/62.2

[56] References Cited

U.S. PATENT DOCUMENTS 4,734,821  3/1988  Morimoto et al. .................. 361/527
4,915,861  4/1990  Yokoyama et al. ................. 252/62.2

FOREIGN PATENT DOCUMENTS

0227433A2  12/1986  European Pat. Off. .
0263182A1   2/1987  European Pat. Off. .

*Primary Examiner*—Donald A. Griffin
*Attorney, Agent, or Firm*—Hill, Van Santen, Steadman & Simpson

[57] ABSTRACT

An electrolyte capacitor composed of at least two foils, an anode foil and a cathode foil, of a valve metal that are wound with one another. The anode foil serving an anode is provided with an oxide layer acting as a dielectric. Spacers that are saturated with an operating electrolyte are arranged between the anode and cathode foils. The operating electrolyte is composed of a quaternary ammonium salt of a carboxyl acid, of an additive of the salt-forming carboxyl acid and of $\gamma$-butyrolactone as a solvent.

3 Claims, No Drawings

ELECTROLYTE CAPACITOR

BACKGROUND OF THE INVENTION

The present invention is directed to an electrolyte capacitor.

Such capacitors are usually composed, for example, of at least two foils of a valve metal (for example, aluminum) that are wound about one another. The foil serving as an anode is provided with an oxide layer which acts as a dielectric, this oxide layer being applied onto the foil in an electrochemical process. In order to increase the capacitance, the foil can be roughened, also in an electrochemical process, before the formation of the oxide layer. Spacers that are saturated with an operating electrolyte are situated between the anode and cathode foils.

When, for example, such capacitors are operated in switched power packed parts as low-voltage electrolyte capacitors, they must have especially low equivalent series resistances (ESR). The equivalent series resistance is the ohmic part in the equivalent series circuit. A high conductivity of the operating electrolyte is an important prerequisite for providing low ESR values. Moreover, the electrolyte must be compounded such that a continuous operation at $\geq 105°$ C. is possible.

Extremely high conductivities up to 15 m$^s$/cm (30° C.) are obtained, for example, with ammonium salts of multi-valent, organic acids in ethyleneglycol-water mixtures. The water part of this electrolyte, however, is so high that the capacitors fail due to corrosion at operating temperatures $>85°$ C.

However, such high conductivities can also be established when amides of short-chain, mono-valent acids are used as solvents. Water can thereby be entirely or partially eliminated. The main examples of such acid amides are N, N-dimethyl formamide (DMF) and N, N-dimethyl acetamide (DMAC).

It must thereby be taken into consideration, however, that most amides are hazardous substances that are injurious to health. Thus, the maximum work place concentration quotients for DMF or, respectively, DMAC amount to only 20 or, respectively, 10 ppm. Moreover, DMF and DMAC are suspected of being carcinogenic and teratogenic.

SUMMARY OF THE INVENTION

It is therefore and object of the present invention to provide an electrolyte capacitor whose electrolyte, for high conductivity and high temperature stability up to 125° C., contains no hazardous substances and whereby the electrolyte, further, does not lead to any noteworthy corrosion in the capacitor.

This object is inventively achieved by an electrolyte capacitor that is composed of at least two foils (an anode foil and a cathode foil) of a valve metal wound about one another, wherein the foil serving as an anode is provided with an oxide layer acting as dielectric, and wherein spacers that are saturated with an operating electrolyte are arranged between anode and cathode foils, this operating electrolyte being composed of a quaternary ammonium salt of a carboxyl acid, of an additive of the salt-forming carboxyl acid and γ-butyrolactone as a solvent.

The electrolyte capacitor preferably has foils of aluminum and contains maleic acid as carboxyl acid and the electrolyte preferably has a pH value of 5 through 7.

No maximum work place concentration quotients have been cited for using the γ-Butyrolactone (BLO) as a solvent, therefore the electrolyte capacitor of the present invention contains no known substances that are hazardous to health.

DESCRIPTION OF THE PREFERRED EMBODIMENT

Although European references EP 0 227 433 A2, as well as, EP 0 263 182 A1 disclose electrolyte capacitors wherein the operating electrolyte is composed of tetraethyl ammonium hydrogen maleate, it must be taken into consideration in these known electrolytes that such solutions assume a pH value of 10 through 12 because of the solvolysis due to butyrolactone. Even when the neutral point of the BLO lies at pH $=8$, this denotes a highly basic medium in which aluminum and aluminum oxide are thermodynamically unstable.

Only by an additive of the salt-forming carboxyl acid, that is, of the maleic acid in the case of tetraethyl ammonium hydrogen maleate, is the pH value corrected to be in the range of pH$=5$ through 7, so that electrolyte no longer has a corrosive effect. This cannot be derived from the known prior art; on the contrary, further additives of up to 10% water (EP 0 263 182) or, respectively, phosphoric acid, nitrobenzene or boric acid (EP 0 227 433) are proposed therein.

It must thereby be taken into consideration, however, that even the slightest additives of phosphoric or, respectively, boric acid are insoluble at 30° C. After dissolving at 90 through 100° C., the additives again crystalize out upon cooling. The addition of water destabilizes the system of tetraethyl ammonium hydrogen maleate and butyrolactone, so that a conductivity decrease by 13% after 1000 hours at 125° C. occurs given the addition of 1 mol water per kilogram of electrolyte. In contrast, the electrolyte has a loss of conductivity of only 4% without the addition of water. A loss of equal size is already reached after 65 hours given the addition of 2 mol water per kilogram of electrolyte ($=3.6\%$ by weight).

By contrast to the quaternary ammonium salts of maleic acid, trialky ammonium salts of maleic acid are thermally unstable. Their butyrolactone solutions have already lost 50% of their conductivity after 250 hours at 125° C., mainly due to conversion of the maleic acid into the isomeric fumaric acid.

Electrolytes that cover a conductivity range of 6 through 15 m$^s$/cm have a concentration of tetraethyl ammonium hydrogen maleate of 0.25 through 0.8 mol per kilogram of electrolyte. Additives of 2% maleic acid (with reference to the proportion of tetraethyl ammonium hydrogen maleate) are generally adequate for pH correction, so that 0.005 through 0.16 mol per kilogram of electrolyte result. The γ-butyrolactone serves as a solvent.

It is important that the electrolytes contain no further constituents, particularly no water additives.

The breakdown voltages of the above-recited solutions amount to 50 through 90 volts (85° C.), a maximum, nominal capacitor voltage of 63 volts being thus possible.

Slight modifications also yield electrolytes having lower conductivity and, thus, higher breakdown voltage.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. Electrolyte capacitor comprising at least two foils, an anode foil and a cathode foil, of a valve metal wound about one another, the anode foil serving as an anode being provided with an oxide layer acting as a dielectric, and spacers, that are saturated with an operating electrolyte, arranged between the anode and cathode foils, said operating electrolyte being composed of a quaternary ammonium salt of a carboxyl acid, of an additive of the salt-forming carboxyl acid and of butyrolactone as a solvent, and the operating electrolyte being composed of 0.25 through 0.8 mol/kg tetraethyl ammonium hydrogen maleate, of 0.05 through 0.16 mol/kg maleic acid and of $\gamma$-butyrolactone.

2. Electrolyte capacitor comprising at least two foils, an anode foil and a cathode foil, of a valve metal wound about one another, the anode foil serving as an anode being provided with an oxide layer acting as a dielectric, and spacers, that are saturated with an operating electrolyte, arranged between the anode and cathode foils, said operating electrolyte being composed of a quaternary ammonium salt of a carboxyl acid, of an additive of the salt-forming carboxyl acid and of butyrolactone as a solvent; the foils being composed of aluminum and the operating electrolyte having a pH value of 5 through 7; and the operating electrolyte being composed of 0.25 through 0.8 mol/kg tetraethyl ammonium hydrogen maleate, of 0.05 through 0.16 mol/kg maleic acid and of $\gamma$-butyrolactone.

3. Electrolyte capacitor comprising at least two foils, an anode foil and a cathode foil, of a valve metal wound about one another, the anode foil serving as an anode being provided with an oxide layer acting as a dielectric, and spacers, that are saturated with an operating electrolyte, arranged between the anode and cathode foils, said operating electrolyte being composed of a quaternary ammonium salt of a carboxyl acid, of an additive of the salt-forming carboxyl acid and of butyrolactone as a solvent; the foils being composed of aluminum and the operating electrolyte having a pH value of 5 through 7 and being composed of 0.25 through 0.8 mol/kg tetraethyl ammonium hydrogen maleate, of 0.05 through 0.16 mol/kg maleic acid and of $\gamma$-butyrolactone.

* * * * *